Figure 6:
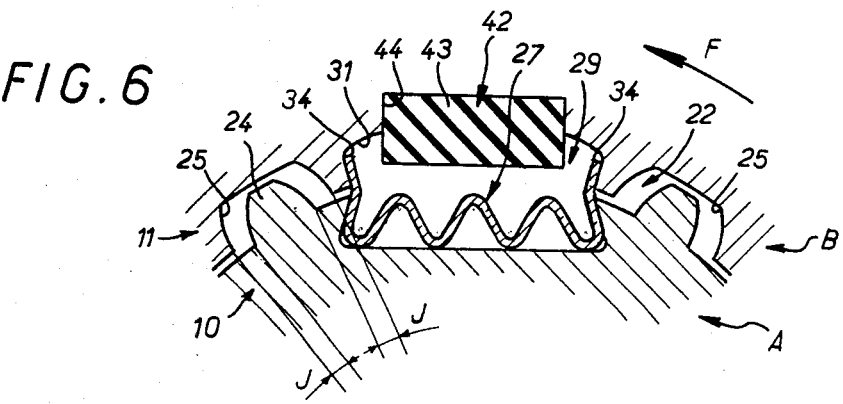

United States Patent [19]

Beccaris et al.

[11] Patent Number: 4,634,397
[45] Date of Patent: Jan. 6, 1987

[54] TORSIONAL DAMPER DEVICE FOR A CLUTCH DISK

[75] Inventors: Carlo Beccaris, Santena; Ernesto Lanzarini, Moncalieri-Torino, both of Italy

[73] Assignee: Valeo, Paris, France

[21] Appl. No.: 683,388

[22] Filed: Dec. 19, 1984

[30] Foreign Application Priority Data

Dec. 30, 1983 [FR] France ................... 83 21134

[51] Int. Cl.⁴ .................................. F16D 3/12
[52] U.S. Cl. ......................... 464/68; 192/106.2
[58] Field of Search ............... 192/106.1, 106.2; 464/66, 68, 84, 100, 101; 267/47, 150, 158, 164, 165

[56] References Cited

U.S. PATENT DOCUMENTS

| 4,185,728 | 1/1980 | Gatewood ............. 464/68 X |
| 4,301,907 | 11/1981 | Carpenter et al. ....... 464/68 X |
| 4,470,494 | 9/1984 | Takeuchi ............... 464/68 X |

FOREIGN PATENT DOCUMENTS

| 854294 | 11/1952 | Fed. Rep. of Germany . |
| 1801969 | 11/1970 | Fed. Rep. of Germany ... 192/106.2 |
| 2508878 | 10/1975 | Fed. Rep. of Germany ... 192/106.2 |
| 819241 | 10/1937 | France . |
| 1479547 | 5/1967 | France . |
| 2270491 | 3/1977 | France . |
| 459325 | 6/1937 | United Kingdom . |
| 2089472 | 6/1982 | United Kingdom ........... 464/68 |

Primary Examiner—Stuart S. Levy
Assistant Examiner—Daniel P. Stodola
Attorney, Agent, or Firm—Charles E. Brown; Charles A. Brown

[57] ABSTRACT

A torsional damper device comprises coaxial parts adapted to rotate relative to one another within predetermined limits. Two of the coaxial parts mesh together with clearance, the meshing portions defining predetermined limits of relative angular movement. A circumferentially acting elastic element is disposed between these two coaxial parts to resist such relative angular movement. A centering device cooperating with the meshing portions is adapted to urge the two coaxial parts circumferentially towards a rest position between the predetermined limits of relative angular movement. These two coaxial parts are formed with shoulders and the centering device comprise at least one elastic member, constituting part of the circumferentially acting elastic element, colocated with the meshing portions. A respective bearing member is disposed between each end of the elastic member and the associated shoulder. Thus the elastic member bears on the shoulders through the intermediary of the bearing members. Each bearing member is formed with a concave dihedron and when the two coaxial members are in a rest position the shoulders define a complementary dihedron. At least one of the bearing members is in one piece with the elastic member, whose corresponding circumferential end is shaped to form the corresponding dihedron.

13 Claims, 10 Drawing Figures

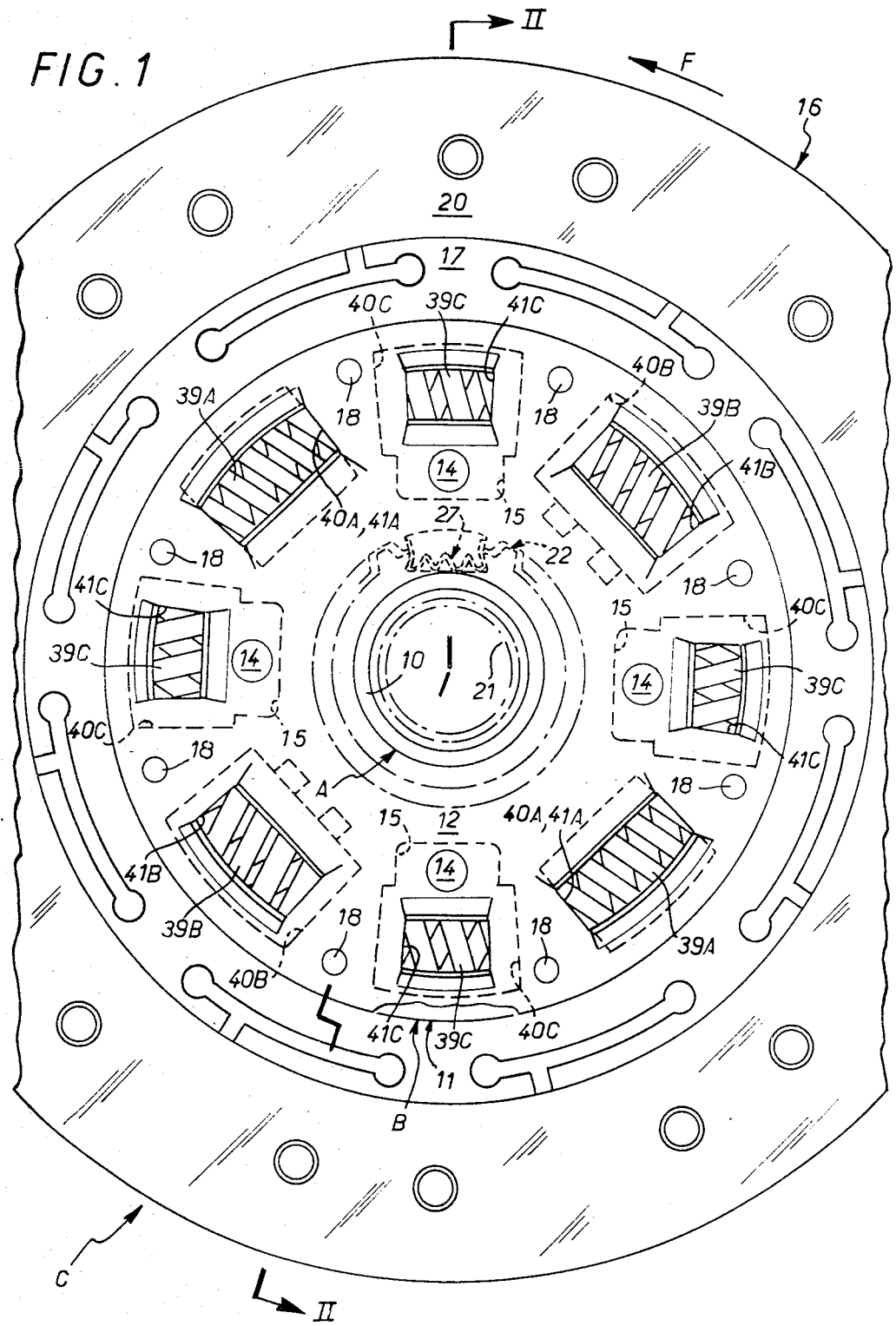

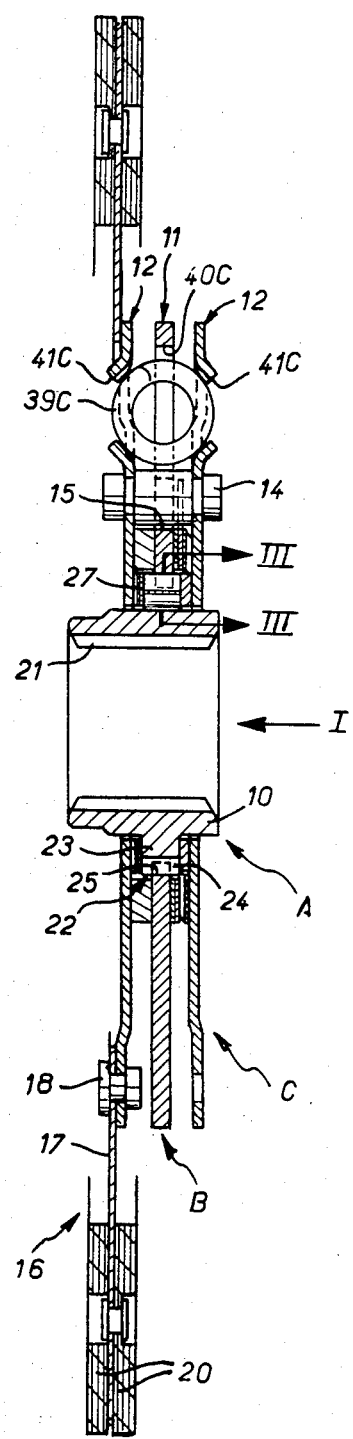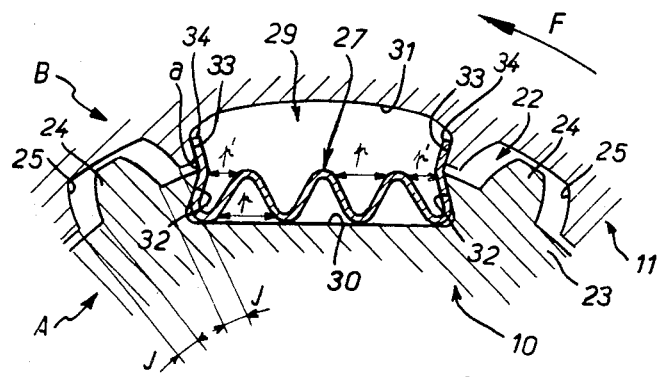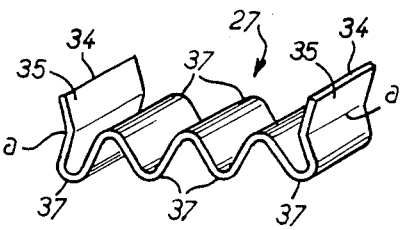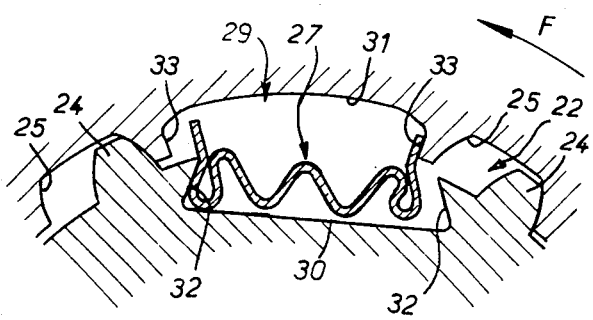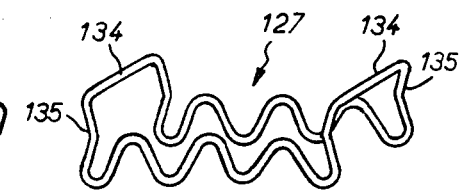

TORSIONAL DAMPER DEVICE FOR A CLUTCH DISK

BACKGROUND OF THE INVENTION

1. Field of the invention

The present invention generally concerns torsional damper devices of the kind comprising at least two coaxial parts mounted to rotate relative to one another within a defined range of relative angular movement and circumferentially acting elastic means disposed between said parts in the circumferential direction resisting such relative angular movement.

2. Description of the prior art

This type of torsional damper is normally incorporated in the design of a clutch disk, particularly for automobile vehicles, in which case one rotating part comprises a friction disk designed to rotate with a first shaft, in practice a driving shaft and the motor output shaft in the case of an automobile vehicle, whereas another of said rotating parts is carried on or itself constitutes a hub designed to rotate with a second shaft, in practice a driven shaft and the gearbox input shaft in the case of an automobile vehicle.

This type of device permits regulated transmission of rotational torque applied to one of its rotating parts where the other is itself subject to a rotational torque. It is thereby able to filter vibrations which may arise at any point in the kinematic system in which it is incorporated, extending from the motor to the driven road wheels in the case of an automobile vehicle.

The present invention is more particularly directed to the case where, in order to delimit relative angular movement between two coaxial parts of a torsional damper device of this kind, there are provided between the latter meshing means, with clearance, cooperating with centering means adapted to urge said coaxial parts in the circumferential direction towards a rest position intermediate the limits of their relative angular movement.

This is the case, for example, in the torsional damper device which is the subject of French Pat. No. 2,242,606 filed Aug. 29 1973 and in the patent of addition thereto No. 2,270,491 filed Apr. 12 1974.

In both cases, the torsional damper device concerned in practice comprises three coaxial parts successively rotatable in pairs and those between which the meshing means with clearance are disposed are those designed to operate at low values of torque.

The centering means provided between these coaxial parts to urge them in the direction towards an intermediate rest position comprise at least one elastic member constituting part of the circumferentially acting elastic means disposed between said coaxial parts, colocated with the meshing means of the latter and adapted, when these coaxial parts are in the rest position, to bear at each of its circumferential ends against a shoulder on each of said coaxial parts.

In the aforementioned French patent No. 2,242,606 and the patent of addition No. 2,270,491 thereto, a helical coil spring is used.

For improved bearing engagement of this spring at its circumferential ends and thus for improved retention in position of the latter there is provided, in the subject French patent and its patent of addition, in association with each of said circumferential ends of this spring a bearing member adapted to be disposed between the latter and the corresponding shoulders of the two coaxial parts concerned.

For appropriate radial retention of a bearing member of this kind and thereby of the elastic centering member, there is further provided, in the patent of addition concerned, on this bearing member and adapted to cooperate with the corresponding shoulders of the coaxial parts concerned, a concave dihedron, said shoulders themselves forming, in the rest position of the assembly, a dihedron which is complementary to that of said bearing member.

In practice, in French Pat. No 2,242,606 and its patent of addition No. 2,270,491, each of the bearing members thus employed is constituted by a plate separate from the elastic centering member with which it is associated.

This arrangement, which has proved and may still prove satisfactory, has the disadvantage of necessitating the use of two distinct parts in addition to the elastic centering member, which increases manufacturing costs and complicates assembly.

A general object of the present invention is an arrangement which, whilst being with advantage able to be employed without modification of other constituent parts of the torsional damper device concerned, permits this disadvantage to be avoided, conferring also other advantages.

SUMMARY OF THE INVENTION

The invention consists in a torsional damper device comprising at least two coaxial parts adapted to rotate relative to one another within predetermined limits of relative angular movement, means adapted to procure meshing, with clearance, between said at least two coaxial parts and to define said predetermined limits of relative angular movement, circumferentially acting elastic means disposed between said at least two coaxial parts in the circumferential direction adapted to resist relative angular movement between said at least two coaxial parts, and centering means cooperating with said meshing means adapted to urge said at least two coaxial parts in the circumferential direction towards a rest position intermediate said predetermined limits of relative angular movement, in which device said at least two coaxial parts are formed with shoulders and said centering means comprise at least one elastic member constituting part of said circumferentially acting elastic means colocated with said meshing means and a respective bearing member disposed between each end of said at least one elastic member and an associated one of said shoulders on said at least two coaxial parts, whereby said at least one elastic member is adapted to bear on said shoulders through the intermediary of said bearing members, and wherein said bearing members are each formed with a concave dihedron, said shoulders are each adapted to form, when said at least two coaxial members are in said rest position, a dihedron complementary to that of said bearing members and at least one of said bearing members is in one piece with said at least one elastic member, the corresponding circumferential end of which is shaped to form the corresponding dihedron.

For example, each of the bearing members is in one piece with the elastic centering member.

Alternatively, it may be merely fastened to the latter.

Be this as it may, one and only one part is advantageously employed to constitute the elastic centering member and the associated bearing members. Assembly at least is thereby simplified, while the unitary member In practice, to constitute these meshing means 22 with clearance the hub 10 features in the center part of its outside surface a peripheral rim 23 along which are circumferentially distributed radial teeth 24.

Conjointly, the hub flange 11 features on its internal periphery, facing the peripheral rim 23 of the hub 10, notches 25 by virtue of which, these being of greater angular extent, it is engaged with clearance over the teeth 24 of the hub 10.

As will be readily understood the possible range of angular movement between the coaxial parts A and B is limited in each direction by the abutting engagement of the teeth 24 of the hub 10 with the corresponding flanks of the notches 25 in the hub flange 11.

Associated with the meshing means 22 with clearance implementing this limitation are centering means adapted to urge the coaxial parts A and B in the circumferential direction towards a rest position intermediate their limits of relative angular movement.

In practice, these centering means comprise at least one elastic member 27 which, constituting part of the circumferentially acting elastic means operative between the coaxial parts A and B, is colocated with the latter's meshing means 22 with clearance.

In practice, in the embodiment shown, only one such elastic member 27 is provided and of itself this constitutes the circumferentially acting elastic means disposed between the coaxial parts A and B.

In other words, this elastic member 27 simultaneously constitutes said circumferentially acting elastic means and the associated centering means.

In a manner known per se, this elastic member 27 is disposed radially between the hub 10 and the hub flange 11, in a housing 29 formed by two notches 30 and 31, the former between two teeth 24 of the hub 10 and the latter between two notches 25 of the hub flange 11.

Each of the two notches 30 and 31 is delimited circumferentially at each end by a respective shoulder 32, 33 and is in practice formed by virtue of radial grooves locally eliminating one or more teeth 24 and notches 25.

For the rest position of the coaxial parts A and B shown in FIG. 3, the shoulders 32 and 33 of the latter are generally obliquely disposed relative to one another, one at least of them being to this end generally oblique relative to a radial direction through its median area.

In the embodiments shown this applies to the shoulder 32 on the coaxial part A. Be this as it may, for the rest position of the coaxial parts A and B the shoulders 32 and 33 conjointly form between them a dihedron.

In practice, it is through the intermediary of a bearing member 34, to be described in detail hereinafter, that each of the circumferential ends of the elastic member 27 is adapted, with the coaxial parts A and B in the rest position, to come into bearing engagement with the corresponding shoulders 32 and 33 of the latter.

In accordance with the invention at least one of the bearing members 34 thus associated with the elastic member 27, and in practice in the embodiment shown each of the latter, is in one piece with this elastic member 27, the corresponding circumferential end of the latter being shaped so as to form of itself a dihedron 35 with an edge a parallel to the axis of the assembly and complementary to the dihedron which such shoulders 32 and 33 form between them in said rest position.

Figure 7:
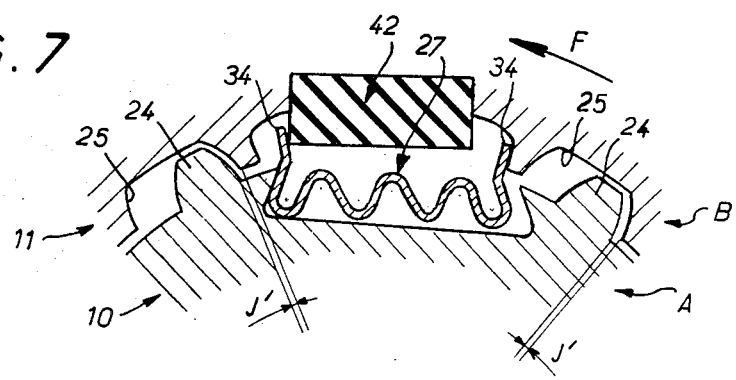
Figure 8:
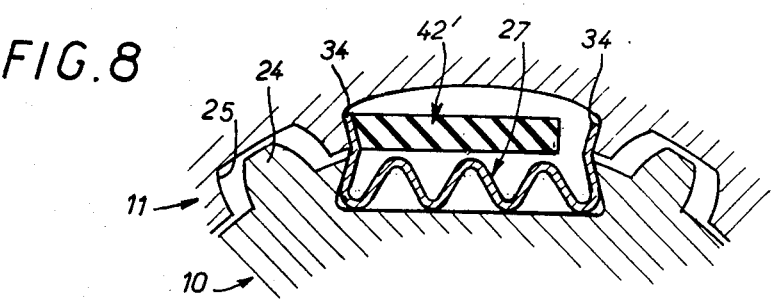
Figure 9:
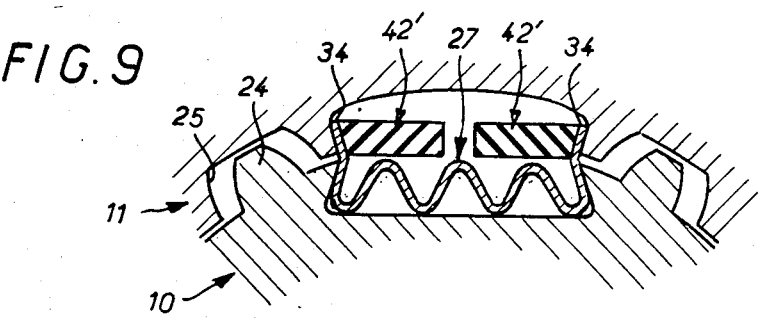

In practice, in the embodiments more particularly shown in FIGS. 1 through 9, the elastic member 27 consists of an appropriately folded metal plate and it thereby comprises, between its circumferential ends, a succession of corrugations 37 in alternate directions.

The associated bearing members 34 are then simply constituted by the ends of the plate, appropriately bent into a dihedron, with the concave sides in opposite directions.

Thus in these embodiments they are in one piece with the elastic member 27 with which they are associated. This also applies to the embodiment shown in FIG. 10, as will be described hereinafter.

The corrugations 37 in the elastic member 27 may be circumferentially regular, all their widths being the same.

Alternatively, the width of some of these corrugations 37 may differ from that of others.

For example, and as shown, the width p' of that at least of the corrugations which is nearest one at least of the circumferential ends of the elastic member 27, and in practice this applies to both these circumferential ends in the embodiment shown, is less than that p of one at least of the corrugations 37 in its median area, which all have the same width in practice in said embodiment.

Be this as it may, in the embodiments shown the corrugations 37 of the elastic member 27 have a radial dimension which is less than that of the associated bearing members 34, this dimension corresponding overall to that of only the shoulders 32 of the coaxial part A, whereas the dimension of the bearing members 34 further corresponds to that of the shoulders 33 of the coaxial part B.

Moreover the elastic member 27 overall extends substantially tangentially relative to a circumference of the assembly and by virtue of the dihedral configuration of the bearing members 34 which constitute its circumferential ends, it is still adequately retained in the radial direction.

In the rest position of the coaxial parts A and B there may, as shown, be the same clearance J on each side of each of the teeth 24 of the hub 10 constituting the coaxial part A, between the flanks of these teeth and the corresponding flanks of notches 25 of the hub flange 11 constituting the coaxial part B engaged over them.

Alternatively, there may be different clearances on each side of each of the teeth 24 of the hub 10 in this rest position.

Conjointly, the coaxial parts B and C are also mounted rotatably relative to one another, against elastic means interposed circumferentially between them and constituted in the embodiment shown by helical coil springs 39A, 39B and 39C extending substantially tangentially to a common circumference of the assembly and housed in part in openings 40A, 40B and 40C formed to this end in the hub flange 11, continuously in the case of the openings 40C with the holes 15 which the latter comprise for the axial spacers 14, and in part in openings 41A, 41B and 41C also formed to this end in the guide rings 12.

The openings 40A and 41A for the springs 39A have the same circumferential extent.

The circumferential extent of the openings 40B and 40C for the springs 39B and 39C is greater than that of the openings 41B and 41C, however, the corresponding clearance being greater for the springs 39C than for the springs 39B.

Relative angular movement between the coaxial parts B and C is limited either by the turns of any of the springs 39A, 39B and 39C coming into contact with one another or through contact of at least one of the axial member being adapted to bear on said shoulders through the intermediary of said bearing members, and said bearing members being formed with a concave dihedron, said shoulders on the respective coaxial parts in said rest position forming a dihedron complementary to that of said bearing members, and at least one of said bearing members being in one piece with a corresponding circumferential end of said elastic member, said elastic member comprising corrugations between its circumferential ends and said corrugations having varied circumferential widths so as to vary the stiffness of said elastic member in the course of relative angular movement of said coaxial parts.

2. Torsional damper device according to claim 1, wherein each of said bearing members is in one piece with an associated circumferential end of said elastic member.

3. Torsional damper device according to claim 1, wherein the circumferential width of at least one of said corrugations near at least one end of said elastic member is less than that of at least one of said corrugations near the center of said elastic member so that the stiffness of said elastic member increases with increasing relative angular movement of said coaxial parts.

4. Torsional damper device according to claim 1, wherein said elastic member is constituted by an appropriately bent leaf spring.

5. Torsional damper device according to claim 1, wherein said elastic member is constituted by an appropriately bent piece of spring wire.

6. Torsional damper device according to claim 1, further comprising at least one damper pad of elastic material engageable with said elastic member and adapted to come into operation before said clearance of said meshing means is fully taken up.

7. Torsional damper device according to claim 6, wherein said damper pad is carried by at least one of said coaxial parts and extends radially away therefrom between said bearing members of the associated elastic member so as to intersect the path of movement of one of said bearing members in at least one direction of relative angular movement between said coaxial parts.

8. Torsional damper device according to claim 6, wherein said one bearing member of said elastic member carries said damper pad projecting circumferentially therefrom towards and adapted to cooperate with the other of said bearing members.

9. Torsional damper device according to claim 8, wherein each of said bearing members of said elastic member carries a damper pad.

10. Torsional damper device comprising at least two coaxial parts adapted to rotate relative to one another within predetermined limits of relative angular movement, meshing means provided with clearance between said coaxial parts and defining said predetermined limits of relative angular movement, circumferentially acting elastic means disposed between said coaxial parts in the circumferential direction for resisting relative angular movement between said coaxial parts, and centering means cooperating with said meshing means for urging said coaxial parts in the circumferential direction towards a rest position intermediate said predetermined limits of relative angular movement, said coaxial parts having shoulders, said centering means comprising at least one elastic member constituting part of said circumferentially acting elastic means colocated with said meshing means, said elastic member having circumferential ends and a respective bearing member disposed between each end of said elastic member and an associated one of said shoulders on said coaxial parts, said elastic member being adapted to bear on said shoulders through the intermediary of said bearing members, and said bearing members being formed with a concave dihedron, said shoulders on the respective coaxial parts in said rest position forming a dihedron complementary to that of said bearing members, and at least one of said bearing members being in one piece with a corresponding circumferential end of said elastic member, at least one damper pad carried by one of said coaxial parts and extending radially away from said coaxial parts between the bearing members of said elastic member so as to intersect the path of movement of said one bearing member in at least one direction of relative angular movement between said coaxial parts, said one bearing member projecting away from an adjacent portion of said elastic member to provide clearance for the positioning of said damper pad.

11. Torsional damper device comprising at least two coaxial parts adapted to rotate relative to one another within predetermined limits of relative angular movement, meshing means being provided with clearance between said coaxial parts and defining said predetermined limits of relative angular movement, circumferentially acting elastic means disposed between said coaxial parts in the circumferential direction for resisting relative angular movement between said coaxial parts, and centering means cooperating with said meshing means for urging said coaxial parts in the circumferential direction towards a rest position intermediate said predetermined limits of relative angular movement, said coaxial parts having shoulders, said centering means comprising at least one elastic member constituting part of said circumferentially acting elastic means colocated with said meshing means, said elastic member having circumferential ends, and a respective bearing member disposed between each end of said elastic member and an associated one of said shoulders on said coaxial parts, said elastic member being adapted to bear on said shoulders through the intermediary of said bearing members, and said bearing members being formed with a concave dihedron, said shoulders on the respective coaxial parts in said rest position forming a dihedron complementary to that of said bearing members, and at least one of said bearing members being in one piece with a corresponding circumferential end of said elastic member, at least one damper pad of elastic material associated with said elastic member and adapted to come into operation before said clearance of said meshing means is fully taken up, said damper pad being fixed to and projecting circumferentially from said one bearing member of said elastic member and cooperable with the other of said bearing members of said elastic member to compress said damper pad.

12. Torsional damper device according to claim 11, wherein there is a damper pad fixed to and projecting circumferentially from each of said bearing member of said elastic member, said damping pads associated with said elastic member eing adapted to abut each other in the course of relative angular movement of said coaxial parts.

13. Torsional damper device comprising at least two coaxial parts adapted to rotate relative to one another within predetermined limits of relative angular movement, meshing means being provided with clearance between said coaxial parts and defining said predetermined limits of relative angular movement, circumferential
axial
relati
and
means
tial d
prede
coaxi
comp
of sai
with
circu
dispo
an ass
said e
ders t